US012586283B2

(12) United States Patent
Li et al.

(10) Patent No.: US 12,586,283 B2
(45) Date of Patent: Mar. 24, 2026

(54) REAL-TIME HAND-HELD MARKERLESS HUMAN MOTION RECORDING AND AVATAR RENDERING IN A MOBILE PLATFORM

(71) Applicant: INNOPEAK TECHNOLOGY, INC., Palo Alto, CA (US)

(72) Inventors: Zhong Li, Palo Alto, CA (US); Shuxue Quan, Palo Alto, CA (US); Yi Xu, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 175 days.

(21) Appl. No.: 18/399,927

(22) Filed: Dec. 29, 2023

(65) Prior Publication Data

US 2024/0153184 A1 May 9, 2024

Related U.S. Application Data

(63) Continuation of application No. PCT/US2021/046351, filed on Aug. 17, 2021.

(51) Int. Cl.
| | |
|---|---|
| *G06T 13/40* | (2011.01) |
| *G06T 7/246* | (2017.01) |
| *G06T 7/73* | (2017.01) |

(52) U.S. Cl.
CPC .............. *G06T 13/40* (2013.01); *G06T 7/248* (2017.01); *G06T 7/74* (2017.01); *G06T 2207/20081* (2013.01); *G06T 2207/20084* (2013.01); *G06T 2207/30196* (2013.01)

(58) Field of Classification Search
CPC ........... G06T 13/40; G06T 7/74; G06T 7/248
See application file for complete search history.

(56) References Cited

U.S. PATENT DOCUMENTS

| | | | | |
|---|---|---|---|---|
| 11,625,838 | B1 * | 4/2023 | Narapureddy | ....... G06V 10/454 |
| | | | | 382/103 |
| 2011/0311129 | A1 | 12/2011 | Milanfar et al. | |
| 2015/0146923 | A1 | 5/2015 | Lee et al. | |
| 2019/0095711 | A1 | 3/2019 | Northcutt et al. | |
| 2020/0327418 | A1 * | 10/2020 | Lyons | .................... G06N 3/126 |
| 2022/0405576 | A1 * | 12/2022 | Helwegen | ............ G06N 3/0464 |

OTHER PUBLICATIONS

WIPO, International Search Report for PCT Application No. PCT/US2021/046351, Nov. 22, 2021.

* cited by examiner

*Primary Examiner* — Kent W Chang
(74) *Attorney, Agent, or Firm* — Sheppard, Mullin, Richter & Hampton LLP

(57) ABSTRACT

A computer system obtains an image of a scene captured by a camera and identifies a two-dimensional (2D) pose of the person in the image. The 2D pose includes a plurality of 2D joint positions in the image. The 2D pose is converted to a three-dimensional (3D) pose of the person including a plurality of 3D joint positions. The computer system determines a rotation angle of each joint relative to a T-pose of the person based on the plurality of 3D joint positions. The rotation angle of each joint is applied to a skeleton template of the avatar. The computer system renders the skeleton template of the avatar having the rotation angle for each joint.

20 Claims, 8 Drawing Sheets

400

Forward Propagation

Hidden Layer
404

Input Layer
402

Output Layer
406

420

412

412

404A

404B

Backward Propagation

420

$w_1$ $w_2$ $w_3$ $w_4$

412

412

$w$

REAL-TIME HAND-HELD MARKERLESS HUMAN MOTION RECORDING AND AVATAR RENDERING IN A MOBILE PLATFORM

CROSS-REFERENCING OF RELEVANT APPLICATIONS

This application is a continuation of the International Patent Application No. PCT/US2021/046351, filed on Aug. 17, 2021, which is hereby incorporated by reference in its entirety.

TECHNICAL FIELD

This application relates generally to data processing technology including, but not limited to, methods, systems, and non-transitory computer-readable media for rendering an avatar in real time based on information of a person captured in an image.

BACKGROUND

Human pose estimation provides information of human motion for use in movies, games, and health applications. Current practice normally requires an industrial grade imaging equipment that is expensive to manufacture, requires professional training to operate, and is oftentimes used with physical markers attached to surface of tracking objects. Physical markers are inconvenient to use, cause data pollution, and even interfere with an object's movement in some situations. To overcome these issues, researchers use multiple optical or depth cameras with multiple viewing angles to provide image input and develop some markerless algorithms to capture human motion. These optical cameras are not suitable for outdoor environments, and particularly in sunlight, a resolution and a collection distance of optical or depth cameras are limited. The markerless algorithms are executed offline on a personal computer having strong computing power. How to enable handheld devices to capture human motion in real time becomes a problem. It would be beneficial to have a more convenient human pose estimation mechanism at a mobile device than the current practice.

SUMMARY

In an aspect, a method is implemented at a computer system for driving an avatar. The method includes obtaining an image of a scene captured by a camera and identifying a two-dimensional (2D) pose of a person in the image, the 2D pose including a plurality of 2D joint positions in the image. The method further includes converting the 2D pose to a three-dimensional (3D) pose of the person. The 3D pose includes a plurality of 3D joint positions. The method further includes determining a rotation angle of each joint relative to a T-pose of the person based on the plurality of 3D joint positions, applying the rotation angle of each joint to a skeleton template of an avatar, and rendering the skeleton template of the avatar having the rotation angle for each joint.

In another aspect, some implementations include a computer system that includes one or more processors and memory having instructions stored thereon, which when executed by the one or more processors cause the processors to perform a method for driving an avatar. In some embodiments, the method includes: obtaining an image of a scene captured by a camera; identifying a 2D pose of a person in the image, the 2D pose including a plurality of 2D joint positions in the image; converting the plurality of 2D joint positions to a plurality of 3D joint positions; determining, based on the plurality of 3D joint positions, a rotation angle of each joint relative to a T-pose of the person; applying the rotation angle of each joint to a skeleton template of an avatar; and rendering the skeleton template of the avatar having the rotation angle for each joint.

In yet another aspect, some implementations include a non-transitory computer-readable medium, having instructions stored thereon, which when executed by one or more processors cause the processors to perform a method for driving an avatar. In some embodiments, the method includes: obtaining an image of a scene captured by a camera; identifying a 2D pose of a person in the image, the 2D pose including a plurality of 2D joint positions in the image; determining a plurality of 3D joint positions based on the plurality of 2D joint positions; determining a rotation angle of each joint relative to a T-pose of the person, based on the plurality of 3D joint positions; obtaining a skeleton template of an avatar having the rotation angle for each joint; and rendering, at a global position of the avatar in a camera coordinate, the skeleton template of the avatar having the rotation angle of each joint.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1A:
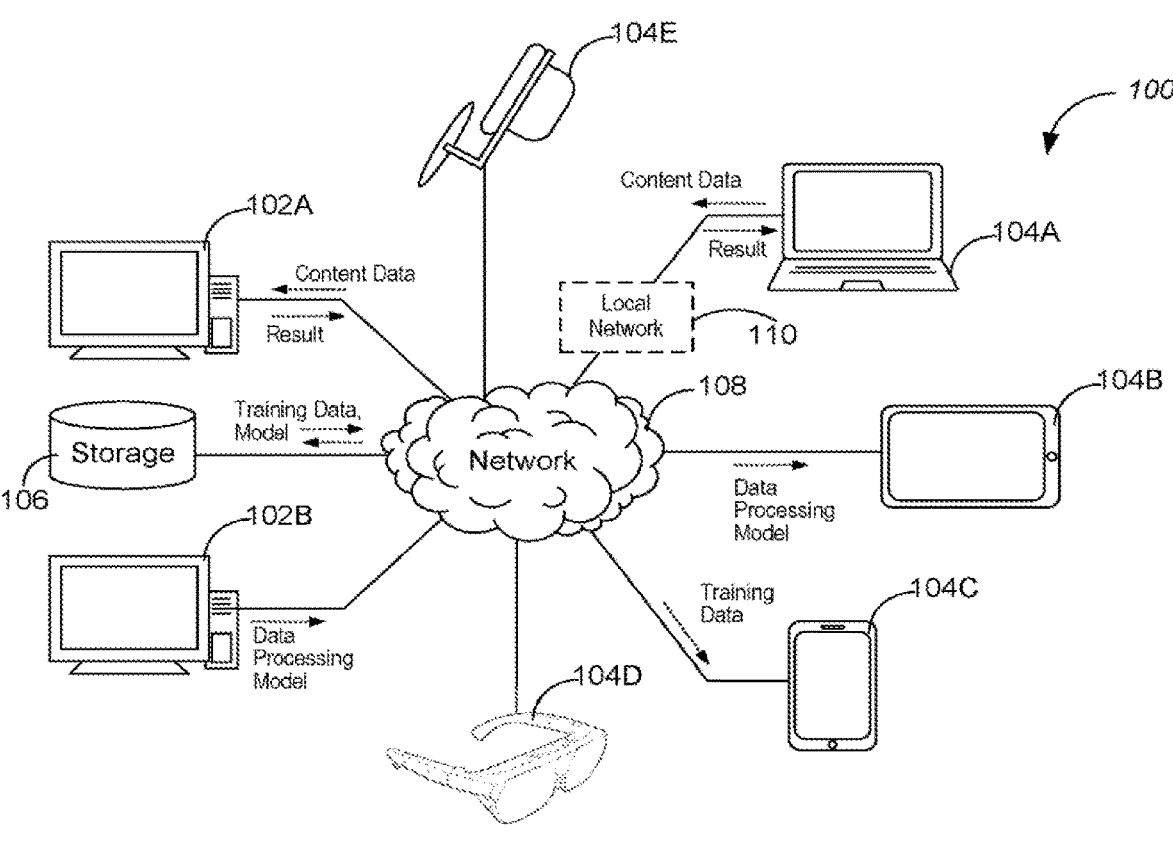
FIG. 1A is an example data processing environment having one or more servers communicatively coupled to one or more client devices, in accordance with some embodiments.

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

There is a need for a convenient human pose estimation mechanism for identifying joints of human bodies in images and determine a human skeleton and associated motion in real time, particularly in images taken by conventional cameras (e.g., a camera of a mobile phone or augmented glasses). Specifically, in some embodiments, joints of human bodies are identified from monocular RGB image data, and applied to determine a human skeleton and associated motion in real time and in both indoor and outdoor environments. A rotation angle of each joint is restored from the image data for use with the human skeleton in real time.

Such human pose estimation may be implemented on a mobile device without labelling the human bodies with any physical markers, and offer a compact, lightweight, real-time and on-device solution for recording human motion capture and driving an avatar. In some embodiments, a differentiable spatial-to-numerical transform layer (e.g., differentiable argmax layer 610 in FIG. 6) is trained in an end-to-end manner to extract two-dimensional (2D) human poses from image data while maintain a heatmap assembling accuracy. In some embodiments, a three-dimensional (3D) human pose estimation network is applied to convert joint positions of the 2D human poses into a 3D root-oriented human skeleton. Relative 3D root-based motion is determined for the human skeleton by solving a linear system, and used to drive motion of an avatar that tracks human motion on a handheld mobile device, in real time and without camera relocalization. By these means, this application is directed to a mobile and compact user-end system that locally determines the 2D and 3D human poses and associated motion data from the image data and drives an avatar using the human pose and motion data in real time.

Various embodiments of this application are directed to 2D and 3D Human pose estimation, human motion recording, and avatar driving and tracking. Locations of key points of objects or human bodies are detected and applied to estimate human motion. Movement of the objects or people are tracked based on the human motion. A virtual object (e.g., an avatar) is driven based on the movement of the objects or people to track real human movement in real time. The pipeline aims to detect human bodies from image data and identify one or more human regions. The image data are cropped and used as input to a pose network that estimates a 2D pose related to a differentiable pipeline. The 2D pose is fed into a 2D-to-3D network and output a root-oriented 3D pose. A rotation angle of each joint is determined relative to a T-pose and applied to a skeleton template. A linear system is solved to generate a relative distance to achieve a skeleton fitting AR effect. The entire pipeline is executed on a mobile device. In some embodiments, a latency from capturing an image to rendering a related virtual object is less than 18 millisecond, e.g., when the mobile device utilizes a Qualcomm Snapdragon® 865 mobile platform.

FIG. 1A is an example data processing environment 100 having one or more servers 102 communicatively coupled to one or more client devices 104, in accordance with some embodiments. The one or more client devices 104 may be, for example, desktop computers 104A, tablet computers 104B, mobile phones 104C, head-mounted display (HMD) (also called augmented reality (AR) glasses) 104D, or intelligent, multi-sensing, network-connected home devices (e.g., a surveillance camera 104E). Each client device 104 can collect data or user inputs, executes user applications, and present outputs on its user interface. The collected data or user inputs can be processed locally at the client device 104 and/or remotely by the server(s) 102. The one or more servers 102 provides system data (e.g., boot files, operating system images, and user applications) to the client devices 104, and in some embodiments, processes the data and user inputs received from the client device(s) 104 when the user applications are executed on the client devices 104. In some embodiments, the data processing environment 100 further includes a storage 106 for storing data related to the servers 102, client devices 104, and applications executed on the client devices 104.

The one or more servers 102 can enable real-time data communication with the client devices 104 that are remote from each other or from the one or more servers 102. Further, in some embodiments, the one or more servers 102 can implement data processing tasks that cannot be or are preferably not completed locally by the client devices 104. For example, the client devices 104 include a game console (e.g., the HMD 104D) that executes an interactive online gaming application. The game console receives a user instruction and sends it to a game server 102 with user data. The game server 102 generates a stream of video data based on the user instruction and user data and providing the stream of video data for display on the game console and other client devices that are engaged in the same game session with the game console. In another example, the client devices 104 include a networked surveillance camera and a mobile phone 104C. The networked surveillance camera collects video data and streams the video data to a surveillance camera server 102 in real time. While the video data is optionally pre-processed on the surveillance camera, the surveillance camera server 102 processes the video data to identify motion or audio events in the video data and share information of these events with the mobile phone 104C, thereby allowing a user of the mobile phone 104 to monitor the events occurring near the networked surveillance camera in the real time and remotely.

The one or more servers 102, one or more client devices 104, and storage 106 are communicatively coupled to each other via one or more communication networks 108, which are the medium used to provide communications links between these devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 108 may be established either directly (e.g., using 3G/4G connectivity to a wireless carrier), or through a network interface 110 (e.g., a router, switch, gateway, hub, or an intelligent, dedicated whole-home control node), or through any combination thereof. As such, the one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

In some embodiments, deep learning techniques are applied in the data processing environment 100 to process content data (e.g., video data, visual data, audio data) obtained by an application executed at a client device 104 to identify information contained in the content data, match the content data with other data, categorize the content data, or synthesize related content data. The content data may broadly include inertial sensor data captured by inertial sensor(s) of a client device 104. In these deep learning techniques, data processing models are created based on one or more neural networks to process the content data. These data processing models are trained with training data before they are applied to process the content data. Subsequently to model training, the mobile phone 104C or HMD 104D obtains the content data (e.g., captures video data via an internal camera) and processes the content data using the data processing models locally.

In some embodiments, both model training and data processing are implemented locally at each individual client device 104 (e.g., the mobile phone 104C and HMD 104D). The client device 104 obtains the training data from the one or more servers 102 or storage 106 and applies the training data to train the data processing models. Alternatively, in some embodiments, both model training and data processing are implemented remotely at a server 102 (e.g., the server 102A) associated with a client device 104 (e.g. the client device 104A and HMD 104D). The server 102A obtains the training data from itself, another server 102 or the storage 106 and applies the training data to train the data processing models. The client device 104 obtains the content data, sends the content data to the server 102A (e.g., in an application) for data processing using the trained data processing models, receives data processing results (e.g., recognized or predicted device poses) from the server 102A, presents the results on a user interface (e.g., associated with the application), rending virtual objects in a field of view based on the poses, or implements some other functions based on the results. The client device 104 itself implements no or little data processing on the content data prior to sending them to the server 102A. Additionally, in some embodiments, data processing is implemented locally at a client device 104 (e.g., the client device 104B and HMD 104D), while model training is implemented remotely at a server 102 (e.g., the server 102B) associated with the client device 104. The server 102B obtains the training data from itself, another server 102 or the storage 106 and applies the training data to train the data processing models. The trained data processing models are optionally stored in the server 102B or storage 106. The client device 104 imports the trained data processing models from the server 102B or storage 106, processes the content data using the data processing models, and generates data processing results to be presented on a user interface or used to initiate some functions (e.g., rendering virtual objects based on device poses) locally.

Figure 1B:
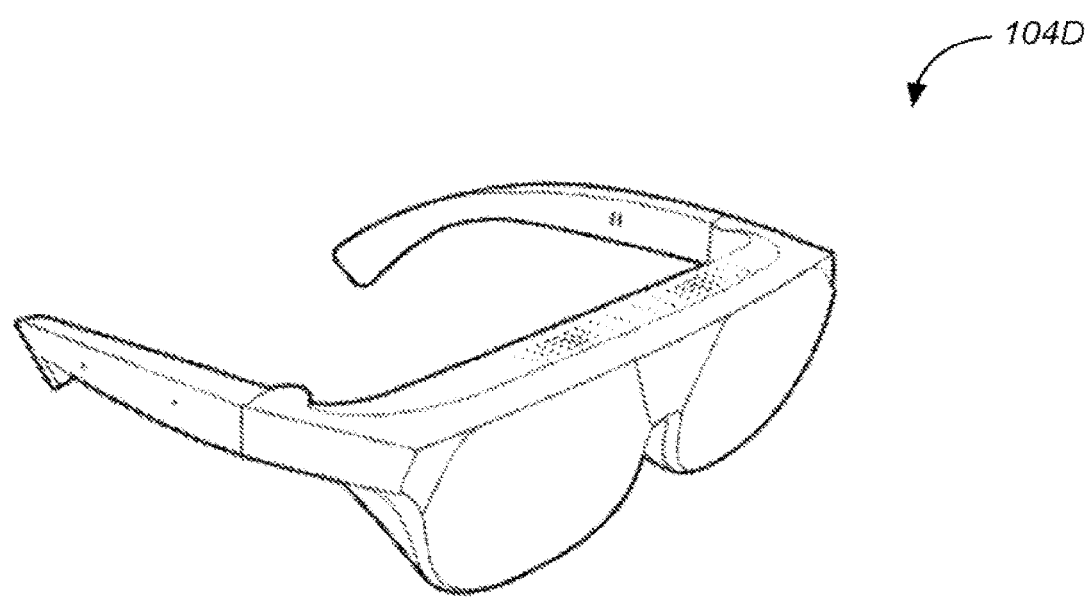
FIG. 1B is a pair of AR glasses that can be communicatively coupled in a data processing environment, in accordance with some embodiments.

FIG. 1B illustrates a pair of AR glasses 104D (also called an HMD) that can be communicatively coupled to a data processing environment 100, in accordance with some embodiments. The AR glasses 104D can be includes a camera, a microphone, a speaker, one or more inertial sensors (e.g., gyroscope, accelerometer), and a display. The camera and microphone are configured to capture video and audio data from a scene of the AR glasses 104D, while the one or more inertial sensors are configured to capture inertial sensor data. In some situations, the camera captures hand gestures of a user wearing the AR glasses 104D. In some situations, the microphone records ambient sound, including user's voice commands. In some situations, both video or static visual data captured by the camera and the inertial sensor data measured by the one or more inertial sensors are applied to determine and predict device poses. The video, static image, audio, or inertial sensor data captured by the AR glasses 104D is processed by the AR glasses 104D, server(s) 102, or both to recognize the device poses. Optionally, deep learning techniques are applied by the server(s) 102 and AR glasses 104D jointly to recognize and predict the device poses. The device poses are used to control the AR glasses 104D itself or interact with an application (e.g., a gaming application) executed by the AR glasses 104D. In some embodiments, the display of the AR glasses 104D displays a user interface, and the recognized or predicted device poses are used to render or interact with user selectable display items (e.g., an avatar) on the user interface.

As explained above, in some embodiments, deep learning techniques are applied in the data processing environment 100 to process video data, static image data, or inertial sensor data captured by the AR glasses 104D. 2D or 3D device poses are recognized and predicted based on such video, static image, and/or inertial sensor data using a data processing model. Training of the data processing model is optionally implemented by the server 102 or AR glasses 104D. Inference of the device poses is implemented by each of the server 102 and AR glasses 104D independently or by both of the server 102 and AR glasses 104D jointly.

Figure 2:
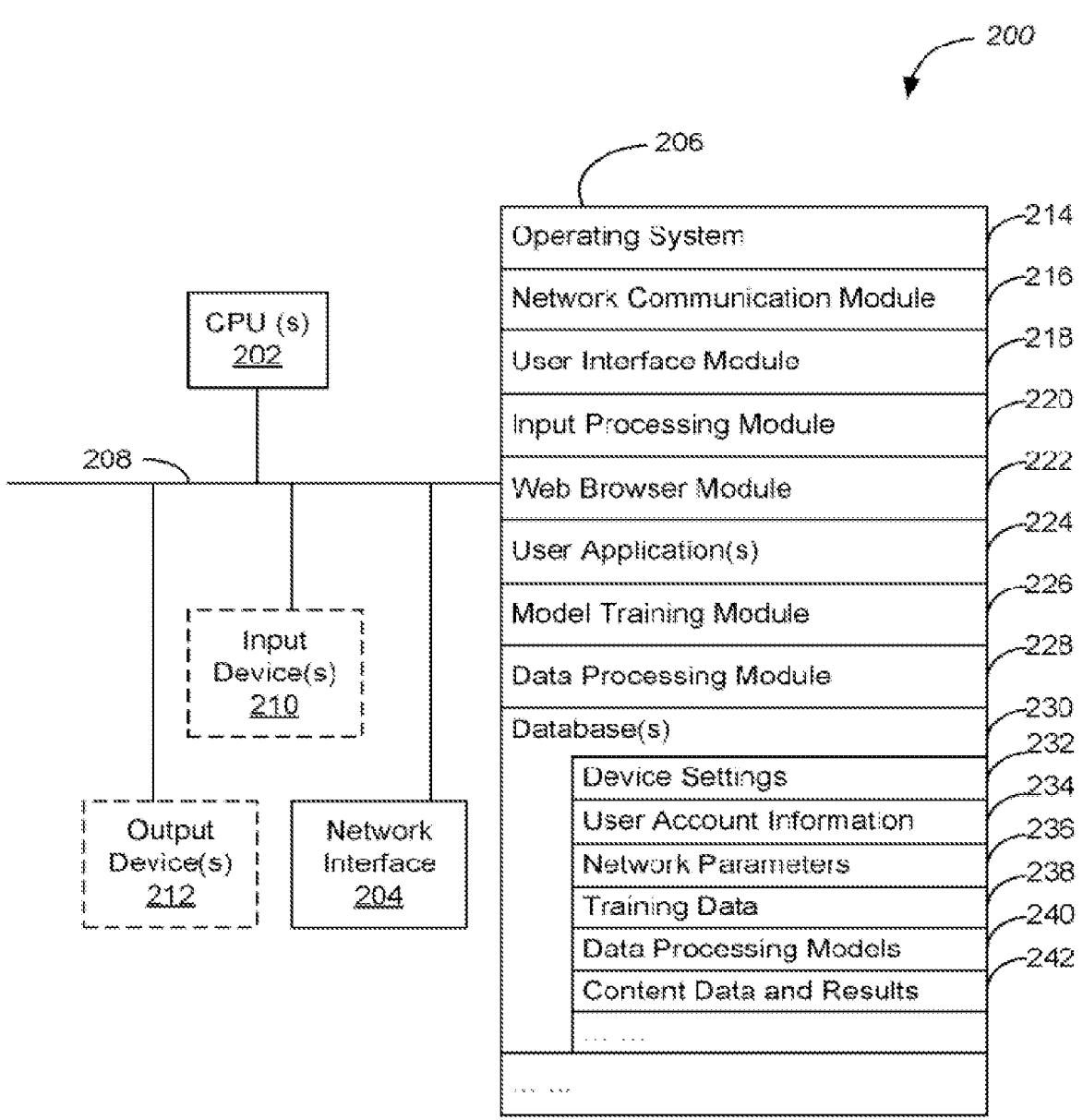
FIG. 2 is a block diagram illustrating a data processing system, in accordance with some embodiments.

FIG. 2 is a block diagram illustrating a data processing system 200, in accordance with some embodiments. The data processing system 200 includes a server 102, a client device 104 (e.g., AR glasses 104D in FIG. 1B), a storage 106, or a combination thereof. The data processing system 200, typically, includes one or more processing units (CPUs) 202, one or more network interfaces 204, memory 206, and one or more communication buses 208 for interconnecting these components (sometimes called a chipset). The data processing system 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, in some embodiments, the client device 104 of the data processing system 200 uses a microphone and voice recognition or a camera and gesture recognition to supplement or replace the keyboard. In some embodiments, the client device 104 includes one or more cameras, scanners, or photo sensor units for capturing images, for example, of graphic serial codes printed on the electronic devices. The data processing system 200 also includes one or more output devices 212 that enable presentation of user interfaces and display content, including one or more speakers and/or one or more visual displays. Optionally, the client device 104 includes a location detection device, such as a GPS (global positioning satellite) or other geo-location receiver, for determining the location of the client device 104.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each server 102 or client device 104 to other devices (e.g., server 102, client device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each client device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;
- One or more user applications 224 for execution by the data processing system 200 (e.g., games, social network applications, smart home applications, and/or other web or non-web based applications for controlling another electronic device and reviewing data captured by such devices);
- Model training module 226 for receiving training data and establishing a data processing model for processing content data (e.g., video, image, audio, or textual data) to be collected or obtained by a client device 104;
- Data processing module 228 (e.g., a data processing module 500 in FIG. 5) for processing content data using data processing models 240 (e.g., a human detection model, a 2D pose estimation model, a 3D pose estimation model), thereby identifying information contained in the content data, matching the content data with other data, categorizing the content data, or synthesizing related content data, where in some embodiments, the data processing module 228 is associated with one of the user applications 224 to process the content data in response to a user instruction received from the user application 224;

- One or more databases 230 for storing at least data including one or more of:
  - Device settings 232 including common device settings (e.g., service tier, device model, storage capacity, processing capabilities, communication capabilities, etc.) of the one or more servers 102 or client devices 104;
  - User account information 234 for the one or more user applications 224, e.g., user names, security questions, account history data, user preferences, and predefined account settings;
  - Network parameters 236 for the one or more communication networks 108, e.g., IP address, subnet mask, default gateway, DNS server and host name;
  - Training data 238 for training one or more data processing models 240;
  - Data processing model(s) 240 for processing content data (e.g., video, image, audio, or textual data) using deep learning techniques, where the data processing models 240 include one or more of: a human detection model, a 2D pose estimation model, and a 3D pose estimation model; and
  - Content data and results 242 that are obtained by and outputted to the client device 104 of the data processing system 200, respectively, where the content data is processed by the data processing models 240 locally at the client device 104 or remotely at the server 102 to provide the associated results 242 to be presented on client device 104.

Optionally, the one or more databases 230 are stored in one of the server 102, client device 104, and storage 106 of the data processing system 200. Optionally, the one or more databases 230 are distributed in more than one of the server 102, client device 104, and storage 106 of the data processing system 200. In some embodiments, more than one copy of the above data is stored at distinct devices, e.g., two copies of the data processing models 240 are stored at the server 102 and storage 106, respectively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 3:
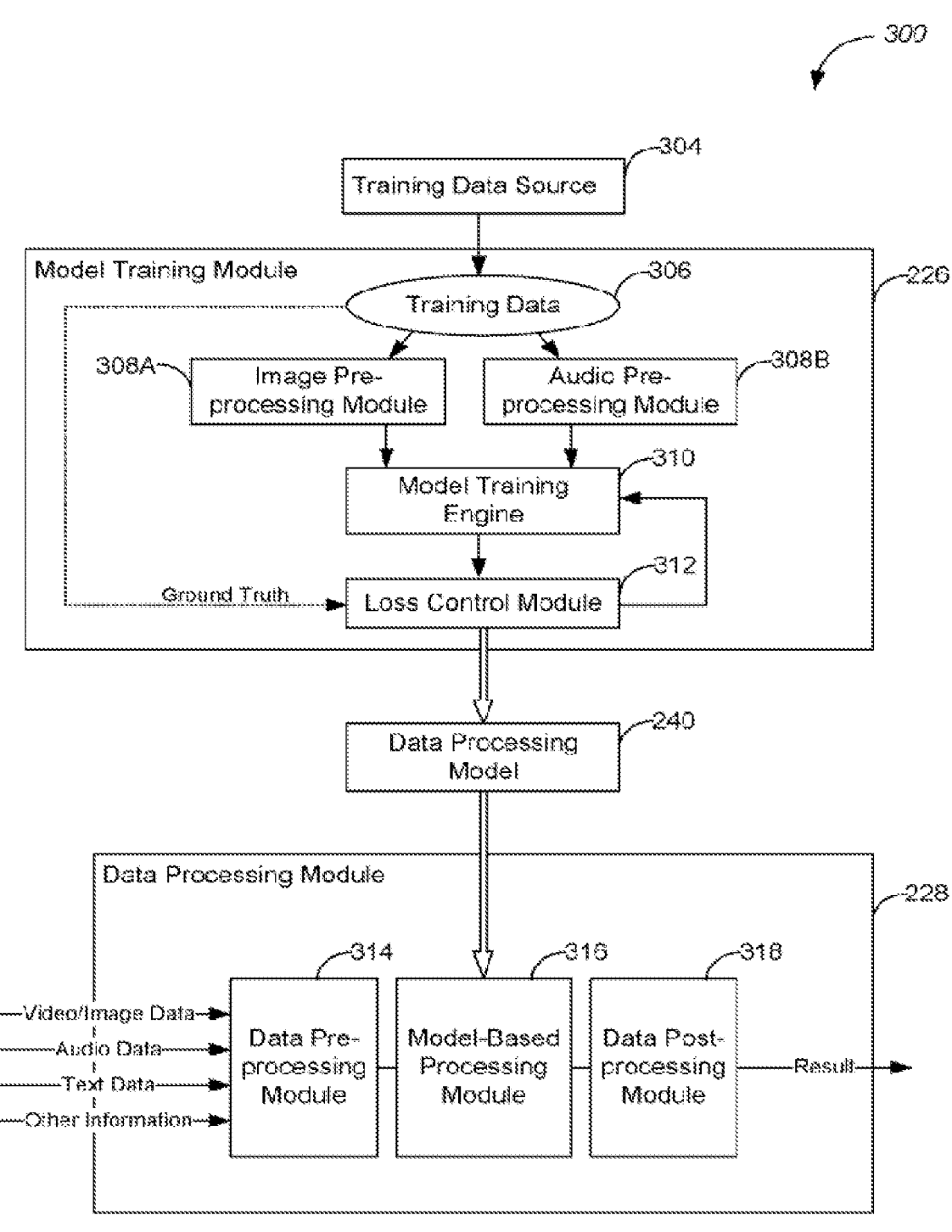
FIG. 3 is an example data processing environment for training and applying a neural network-based data processing model for processing visual and/or audio data, in accordance with some embodiments.

FIG. 3 is another example data processing system 300 for training and applying a neural network based (NN-based) data processing model 240 for processing content data (e.g., video, image, audio, or textual data), in accordance with some embodiments. The data processing system 300 includes a model training module 226 for establishing the data processing model 240 and a data processing module 228 for processing the content data using the data processing model 240. In some embodiments, both of the model training module 226 and the data processing module 228 are located on a client device 104 of the data processing system 300, while a training data source 304 distinct form the client device 104 provides training data 306 to the client device 104. The training data source 304 is optionally a server 102 or storage 106. Alternatively, in some embodiments, both of the model training module 226 and the data processing module 228 are located on a server 102 of the data processing system 300. The training data source 304 providing the training data 306 is optionally the server 102 itself, another server 102, or the storage 106. Additionally, in some embodiments, the model training module 226 and the data processing module 228 are separately located on a server 102 and client device 104, and the server 102 provides the trained data processing model 240 to the client device 104.

The model training module 226 includes one or more data pre-processing modules 308, a model training engine 310, and a loss control module 312. The data processing model 240 is trained according to a type of the content data to be processed. The training data 306 is consistent with the type of the content data, so is a data pre-processing module 308 applied to process the training data 306 consistent with the type of the content data. For example, an image pre-processing module 308A is configured to process image training data 306 to a predefined image format, e.g., extract a region of interest (ROI) in each training image, and crop each training image to a predefined image size. Alternatively, an audio pre-processing module 308B is configured to process audio training data 306 to a predefined audio format, e.g., converting each training sequence to a frequency domain using a Fourier transform. The model training engine 310 receives pre-processed training data provided by the data pre-processing modules 308, further processes the pre-processed training data using an existing data processing model 240, and generates an output from each training data item. During this course, the loss control module 312 can monitor a loss function comparing the output associated with the respective training data item and a ground truth of the respective training data item. The model training engine 310 modifies the data processing model 240 to reduce the loss function, until the loss function satisfies a loss criteria (e.g., a comparison result of the loss function is minimized or reduced below a loss threshold). The modified data processing model 240 is provided to the data processing module 228 to process the content data.

In some embodiments, the model training module 226 offers supervised learning in which the training data is entirely labelled and includes a desired output for each training data item (also called the ground truth in some situations). Conversely, in some embodiments, the model training module 226 offers unsupervised learning in which the training data are not labelled. The model training module 226 is configured to identify previously undetected patterns in the training data without pre-existing labels and with no or little human supervision. Additionally, in some embodiments, the model training module 226 offers partially supervised learning in which the training data are partially labelled.

The data processing module 228 includes a data pre-processing modules 314, a model-based processing module 316, and a data post-processing module 318. The data pre-processing modules 314 pre-processes the content data based on the type of the content data. Functions of the data pre-processing modules 314 are consistent with those of the pre-processing modules 308 and covert the content data to a predefined content format that is acceptable by inputs of the model-based processing module 316. Examples of the content data include one or more of: video, image, audio, textual, and other types of data. For example, each image is pre-processed to extract an ROI or cropped to a predefined image size, and an audio clip is pre-processed to convert to a frequency domain using a Fourier transform. In some situations, the content data includes two or more types, e.g., video data and textual data. The model-based processing module 316 applies the trained data processing model 240 provided by the model training module 226 to process the pre-processed content data. The model-based processing module 316 can also monitor an error indicator to determine whether the content data has been properly processed in the data processing model 240. In some embodiments, the processed content data is further processed by the data post-processing module 318 to present the processed content data in a preferred format or to provide other related information that can be derived from the processed content data.

Figures 4A, 4B:
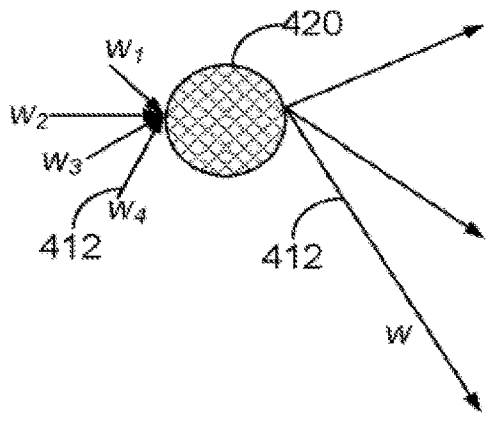
FIG. 4A is an example neural network applied to process content data in an NN-based data processing model, in accordance with some embodiments.
FIG. 4B is an example node in the neural network, in accordance with some embodiments.

FIG. 4A is an example neural network (NN) 400 applied to process content data in an NN-based data processing model 240, in accordance with some embodiments, and FIG. 4B is an example node 420 in the neural network (NN) 400, in accordance with some embodiments. The data processing model 240 is established based on the neural network 400. A corresponding model-based processing module 316 applies the data processing model 240 including the neural network 400 to process content data that has been converted to a predefined content format. The neural network 400 includes a collection of nodes 420 that are connected by links 412. Each node 420 receives one or more node inputs and applies a propagation function to generate a node output from the one or more node inputs. As the node output is provided via one or more links 412 to one or more other nodes 420, a weight w associated with each link 412 is applied to the node output. Likewise, the one or more node inputs are combined based on corresponding weights $w_1$, $w_2$, $w_3$, and $w_4$ according to the propagation function. In an example, the propagation function is a product of a non-linear activation function and a linear weighted combination of the one or more node inputs.

The collection of nodes 420 is organized into one or more layers in the neural network 400. Optionally, the one or more layers includes a single layer acting as both an input layer and an output layer. Optionally, the one or more layers includes an input layer 402 for receiving inputs, an output layer 406 for providing outputs, and zero or more hidden layers 404 (e.g., 404A and 404B) between the input and output layers 402 and 406. A deep neural network has more than one hidden layers 404 between the input and output layers 402 and 406. In the neural network 400, each layer is only connected with its immediately preceding and/or immediately following layer. In some embodiments, a layer 402 or 404B is a fully connected layer because each node 420 in the layer 402 or 404B is connected to every node 420 in its immediately following layer. In some embodiments, one of the one or more hidden layers 404 includes two or more nodes that are connected to the same node in its immediately following layer for down sampling or pooling the nodes 420 between these two layers. Particularly, max pooling uses a maximum value of the two or more nodes in the layer 404B for generating the node of the immediately following layer 406 connected to the two or more nodes.

In some embodiments, a convolutional neural network (CNN) is applied in a data processing model 240 to process content data (particularly, video and image data). The CNN employs convolution operations and belongs to a class of deep neural networks 400, i.e., a feedforward neural network that only moves data forward from the input layer 402 through the hidden layers to the output layer 406. The one or more hidden layers of the CNN are convolutional layers convolving with a multiplication or dot product. Each node in a convolutional layer receives inputs from a receptive area associated with a previous layer (e.g., five nodes), and the receptive area is smaller than the entire previous layer and may vary based on a location of the convolution layer in the convolutional neural network. Video or image data is pre-processed to a predefined video/image format corresponding to the inputs of the CNN. The pre-processed video or image data is abstracted by each layer of the CNN to a respective feature map. By these means, video and image data can be processed by the CNN for video and image recognition, classification, analysis, imprinting, or synthesis.

Alternatively and additionally, in some embodiments, a recurrent neural network (RNN) is applied in the data processing model 240 to process content data (particularly, textual and audio data). Nodes in successive layers of the RNN follow a temporal sequence, such that the RNN exhibits a temporal dynamic behavior. In an example, each node 420 of the RNN has a time-varying real-valued acti-vation. Examples of the RNN include, but are not limited to, a long short-term memory (LSTM) network, a fully recur-rent network, an Elman network, a Jordan network, a Hopfield network, a bidirectional associative memory (BAM network), an echo state network, an independently RNN (IndRNN), a recursive neural network, and a neural history compressor. In some embodiments, the RNN can be used for handwriting or speech recognition. It is noted that in some embodiments, two or more types of content data are processed by the data processing module 228, and two or more types of neural networks (e.g., both CNN and RNN) are applied to process the content data jointly.

The training process is a process for calibrating all of the weights $w_i$ for each layer of the learning model using a training data set which is provided in the input layer 402. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propaga-tion, a margin of error of the output (e.g., a loss function) is measured, and the weights are adjusted accordingly to decrease the error. The activation function is optionally linear, rectified linear unit, sigmoid, hyperbolic tangent, or of other types. In some embodiments, a network bias term b is added to the sum of the weighted outputs from the previous layer before the activation function is applied. The network bias b provides a perturbation that helps the NN 400 avoid over fitting the training data. The result of the training includes the network bias parameter b for each layer.

Figure 5:
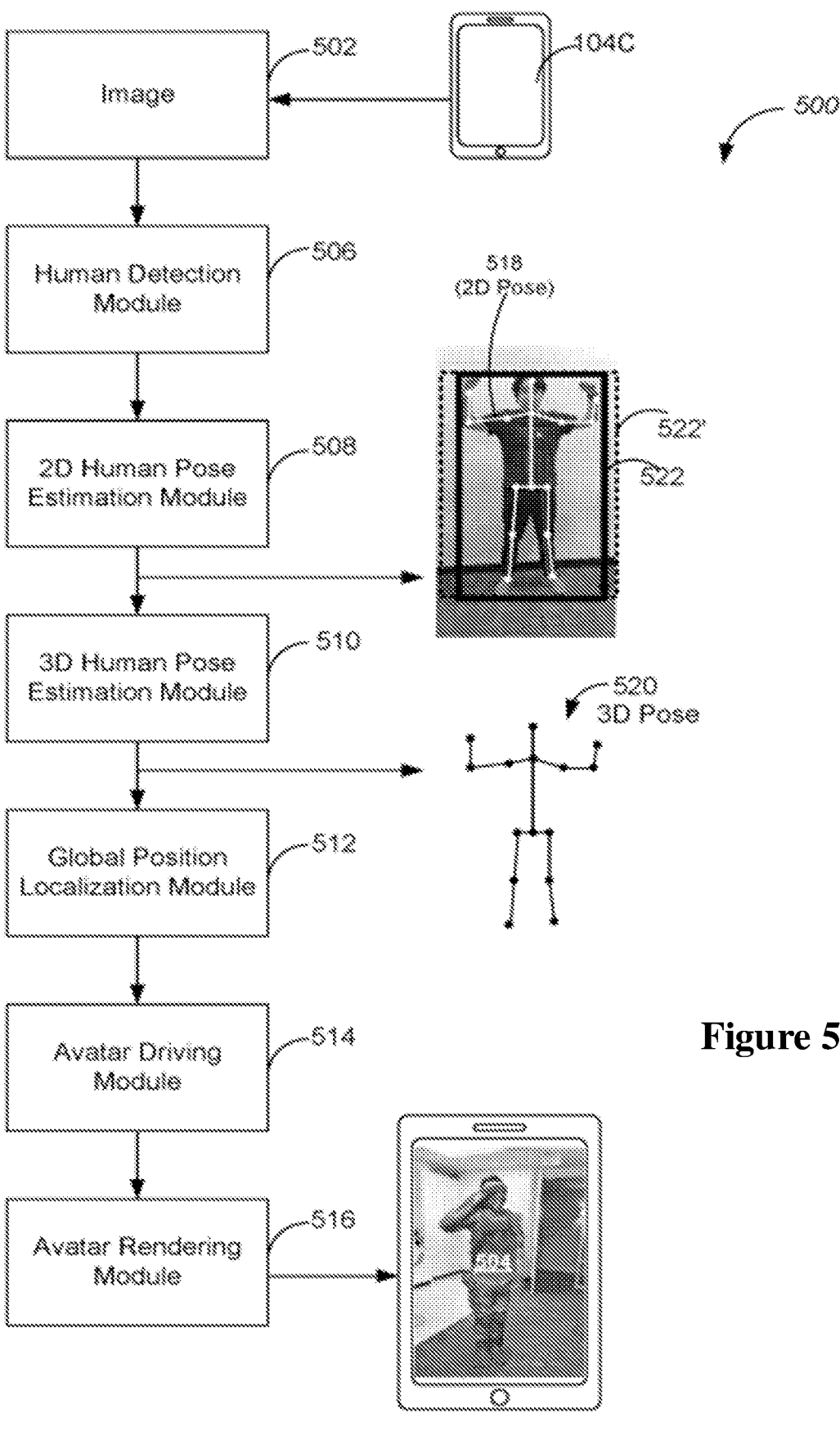
FIG. 5 is a block diagram of a data processing module that renders an avatar based on image data, in accordance with some embodiments.

FIG. 5 is a block diagram of a data processing module 500 that renders an avatar 504 based on image data, in accor-dance with some embodiments. The image data includes one or more images 502 captured by a camera (e.g., included in a mobile phone 104C or AR glasses 104D). The data processing module 500 obtains an image 502, renders the avatar 504 based on the image 502, and causes the avatar 504 to be displayed on a screen of the mobile phone or AR glasses 104D. The data processing module 500 includes a subset or all of: a human detection module 506, a 2D human pose estimation module 508, a 3D human pose estimation module 510, a global position localization module 512, an avatar driving module 514, and an avatar rendering module 516. These modules 506-516 cause the data processing module 500 to identify a 2D pose 518 of a person in the image 502, convert the 2D pose to a 3D pose 520 of the person, determine a global position of the avatar 504, determine a rotation angle of each joint relative to a T-pose of the person, apply the rotation angle of each joint to a skeleton template of the avatar 504, and/or render the skeleton template of the avatar 504 having the rotation angle for each joint at the global position. In some embodiments, a client device 104 includes the data processing module 500 and is configured to render and drive the avatar 504 based on the image 502 captured by the client device 104 itself. Alternatively, in some embodiments, a first client device 104 includes the data processing module 500 and is configured to render and drive the avatar 504 based on the image 502 captured by a second distinct client device 104.

The human detection module 506 obtains the image 502 (e.g., an RGB image), detects a human body from the image 502, and generates a human region 522 to enclose the human body. In an example, the human region 522 has a rectangular shape that closely encloses the human body. In some embodiment, a human detection model is trained and applied to detect the human body and generate the human region 522. The human detection model optionally includes an inverted residual block. In an example, the human detection model includes an anchor-based one-shot detec-tion framework (e.g., a single-stage real-time object detec-tion model, YoloV2) which is configured to generate a regression result associated with the human region 522.

The 2D human pose estimation module 508 is coupled to the human detection module 506, and configured to predict locations of key points of the human body (specifically, 16 joints of the human body) within a person bounding box 522' associated with the human region 522. In some embodi-ments, the person bounding box 522' has a predefined aspect ratio that applies to any bounding box associated with human bodies detected within the image 502. Given the predefined aspect ratio, a width or a length of the bounding box 522' is expanded to enclose the human body entirely without distorting an image aspect ratio of the image 502. In some embodiments, the bounding box 522' includes 224× 224 pixels. In some embodiments, the image 502 is cropped and/or scaled to 224×224 pixels, and the bounding box 522' is less than 224×224 pixels and enclosed within the cropped image 502.

In some embodiments, a 2D pose estimation network is trained to predict the positions of key points of the human body in the image 502. The 2D pose estimation network includes a backbone network (e.g., MobilenetV2), a heat-map network, and a differentiable argmax layer. The back-bone network is configured to extract a plurality of image features, and the heatmap network is configured to generate a respective heatmap from the image features for each joint of the human body. In some embodiments, the backbone network includes a plurality of dense upsampling convolu-tion layers stacked to make the backbone network more efficient in a mobile platform. The image features extracted by the backbone network have a first resolution, and the respective heatmap of each joint has a second resolution that is higher than the first resolution. More specifically, after the image 502 is cropped, the backbone and heatmap networks of the 2D pose estimation module 508 determine a plurality of key points (e.g., joints of the human body) and a prob-ability for each point that is within a disk of radius from a location of each key point. Each key point is associated with the respective heatmap showing the probability for each point within the disk of radius from the location of the respective key point.

The differentiable argmax layer is configured to identify a coordinate of each joint directly through the respective heatmap. For each of the 16 joints of the human body, the differentiable argmax layer is applied to transform the respective heatmap, thereby identifying a 2D joint position of the respective joint. In some embodiments, each heatmap has a local maximum probability at the location of the respective key point associated with the joint of the human body. Conversely, in some embodiments, the differentiable argmax layer is configured to transform each heatmap into numerical coordinates (e.g., $(x_i, y_i)$ for an i-th joint), thereby identifying the location of the respective key point associated with the joint of the human body (i.e., a 2D joint position of the respective joint). The differentiable argmax layer is fully differentiable and has no trainable parameters. The differentiable argmax layer receives an m×n heatmap H, which is normalized. Let X and Y be m×n resolution matrices, where $$X_{ij} = \frac{2j - (n+1)}{n}$$

and $$Y_{ij} = \frac{2i - (m+1)}{m}.$$

Each X or Y matrix scales each x or y coordinate into a range of (−1,1) respectively. The differentiable argmax layer corresponds to a first Frobenius inner product of a first matrix X and the heatmap H and a second Frobenius inner product of a second matrix Y and the heatmap H, and projects the 2D joint position into (−1, 1). In some embodiments, each 2D joint position is unprojected or unnormalized to its original resolution. By these means, the 2D joint position can be identified with a sub-pixel precision.

In some embodiments, the whole training pipeline of the 2D pose estimation network is implemented in an end-to-end manner. An example loss is a sum of a joint loss of each joint and a heatmap loss of each joint. In some embodiments, the 2D pose estimation network applied by the 2D pose estimation module is trained using two public datasets, MPII and COCO dataset. Each image 502 used to train the 2D pose estimation network has at least 10 human joints (e.g., >10 key points), which makes the selected dataset contains around 40000 images. In an example, the 2D pose estimation network (e.g., including a backbone network, a heatmap network, and differentiable argmax layer) is trained in an end-to-end manner using 0.45G floating point operations per second (FLOPS), which therefore can be implemented in a mobile device.

The 3D human pose estimation module 510 is coupled to the 2D human pose estimation module 508, and receives the 2D joint positions generated thereby. A 3D pose estimation network is applied to predict a 3D pose 520 including 3D joint positions corresponding to key points of the human body detected in the image 502. In an example, the 3D pose 520 includes 16 body joint locations in a 3D space based on the 2D joint positions of the 16 body joints provided by the 2D pose estimation module 508. The 3D pose estimation network includes one or more input linear layers, a basic block, and an output linear layer. The 2D joint positions for n joints correspond to 2n positional values (e.g., (x, y) for each joint). The one or more input linear layers are configured to increase a number of joint features associated with the n joints from 2n to 1024. The joint features are further processed iteratively using the basic block, in an example, the basic block stacks one or more linear layers, batch normalization, dropout, a rectifier, and a skip connection. In some situations, the basic block is iteratively applied for four times. The output linear layer is applied to decrease a dimension of the joint features from 1024 to 3n, where n is the number of the joints. As such, the 3D pose estimation network has a simple and efficient deep neural network architecture, and is configured to minimize a prediction error from 2D joint positions to 3D joint positions (e.g., (x, y, z) for each joint).

In some embodiments, the 3D pose estimation network is trained on Human3.6M datasets. The 2D joint positions are normalized into a fixed size coordinate space. Specifically, a bounding box is created based a maximum x-axis value and a maximum y-axis value of the 2D joint position, and an affine transformation is applied to create a resolution. For normalization, the x- or y-axis value of each 2D joint position subtracts a x- or y-axis mean and is divided by a x- or y-axis standard deviation, respectively. Likewise, the x-, y-, or z-axis value of each 3D joint position subtracts a x-, y-, or z-axis mean and is divided by a x-, y-, or z-axis standard deviation, respectively. A 3D position of a hip position of the 3D pose 520 set to the origin of a 3D coordinate of the 3D pose 520. A hip key point or node is also called a root joint of the 3D pose 520. In some embodiments, the 3D pose estimation network is trained using mini-batches of Human3.6m datasets (e.g., having 64 data items in a batch) at a starting learning rate of 0.001 and for around 200 epochs. In an example, the inference time in a mobile device 104C is around 1 millisecond, allowing the 3D joint positions to be determined in real time on the mobile devices.

The global position localization module 512 is coupled to the 3D human pose estimation module 510, and receives the 3D pose 520 including the 3D joint positions of joints of the human body captured in the image 502. Such 3D joint positions are converted to human motion in a 3D space. The global position localization module 512 enables an AR real-time human motion capture system that solves a global position T of a human object (i.e., the avatar 504) for estimating the avatar's motion relative to the real world. When the avatar 504 is rendered according to a pose of the camera capturing the image 502, key points of a virtual skeleton of the avatar match the 2D joint positions of the human body captured in the image 502. In some embodiments, a camera intrinsic projection matrix is P, and the 3D joint positions determined from the image 502 is X. A human global position movement is Δx in real time, so that the 2D joint position $X_{2d}$ in the image 502 is represented as:

$$X_{2d} = P(X + \Delta x) \tag{1}$$

Equation (1) is derived into a linear system, and solved using singular value decomposition (SVD). In an example, such global position solving costs about 1 millisecond in a mobile device 104C using an advanced reduced instruction set computing (RISC) architecture (ARM) processor.

The avatar driving module 514 is coupled to the global position localization module 512, and drives a 3D avatar model based on a rotation angle of each joint node. The rotation angle of each joint node is applied relative to a T-pose (i.e., a bind pose or reference pose), which is a default pose for the 3D avatar model before the 3D avatar model is animated. The 3D avatar model is driven by a linear blend skinning method. The avatar driving module 514 builds a kinematic skeleton tree start from a hip node (i.e., a root node) of the T-pose. In the kinematic tree, each joint node has a parent node closer to the hip node and a children node further from the hip node. Each joint node forms a plane with the parent and children node, and corresponds to a normal vector connecting the parent node of the 3D pose 520 to the children node of the 3D pose 520. Likewise, each joint node has a reference vector connecting a parent node of the T-pose to a children node of the T-pose. The avatar driving module 514 determines a normal vector rotation (i.e., the rotation angle of each joint node) between the normal vector relative to the reference vector associated with the T-pose.

The avatar rendering module 516 is coupled to the avatar driving module 514, and renders the 3D avatar model (i.e., the avatar 504) on a display of a client device 104. In some embodiments, the client device 104 has a camera configured to capture images of a field of view of a scene, and the avatar 504 is overlaid on top of the field of view on the display. Further, in some embodiments, the same camera is applied to capture the human body applied to extract the 2D and 3D joint positions for driving and rendering the avatar 504, and the avatar 504 is displayed in real time on top of the human body in the field of view of the camera. The avatar 504 substantially overlaps the human body captured by the camera. Conversely, in some embodiments, a first camera is applied to capture the human body applied to extract the 2D and 3D joint positions for driving and rendering the avatar 504, and the avatar 504 is displayed in real time in a field of view of a distinct second camera. A latency between rendering the avatar 504 and capturing the image 502 from which the avatar 504 is rendered is substantially small (e.g., less than a threshold latency (e.g., 5 milliseconds)), such that the avatar 504 is regarded as being rendered substantially in real time.

The data processing module 500 is implemented in real time on a mobile device (e.g., a mobile device 104C). Post-processing and linear calculation can be optimized in the data processing module 500. For example, the 2D and 3D pose estimation networks applied in the 2D and 3D human pose estimation modules 508 and 510 are quantized. Each of the 2D and 3D pose estimation networks includes a plurality of layers, and each layer has a respective number of filters. Each filter is associated with a plurality of weights. For each of the 2D and 3D pose estimation networks, a float32 format is maintained for the plurality of weights of each filter while the respective pose estimation network is trained. After the respective pose estimation network is generated, the plurality weights of each filter are quantized to an int8, uint8, int16 or uint16 format. In some embodiments, a server trains the 2D and 3D pose estimation networks in the float32 format, and quantizes them to the int8, uint8, int16 or uint16 format. The quantized 2D and 3D pose estimation networks are provided to the mobile device for use in inference of the avatar 504. In some embodiments, the 2D and 3D pose estimation networks applied in the 2D and 3D human pose estimation modules 508 and 510 are executed by a neural network inference engine of a digital signal processing (DSP) unit or a graphics processing unit (GPU), e.g., a Qualcomm Snapdragon Neural Processing Engine (SNPE). In an example, computing power consumption is roughly 0.8G FLOPS, which can be conveniently executed on at many chips in the market.

In some embodiments, the data processing module 500 corresponds to a comprehensive deep learning network including the human detection network, 2D pose estimation network, and 3D pose estimation network. The comprehensive deep learning network is trained in an end-to-end manner. Alternatively, each of the human detection network, 2D pose estimation network, and 3D pose estimation network is trained separately. Model training is optionally implemented at a server 102 or a client device 104, while the data processing module 500 is executed at the client device 104 to render the avatar.

Figure 6:
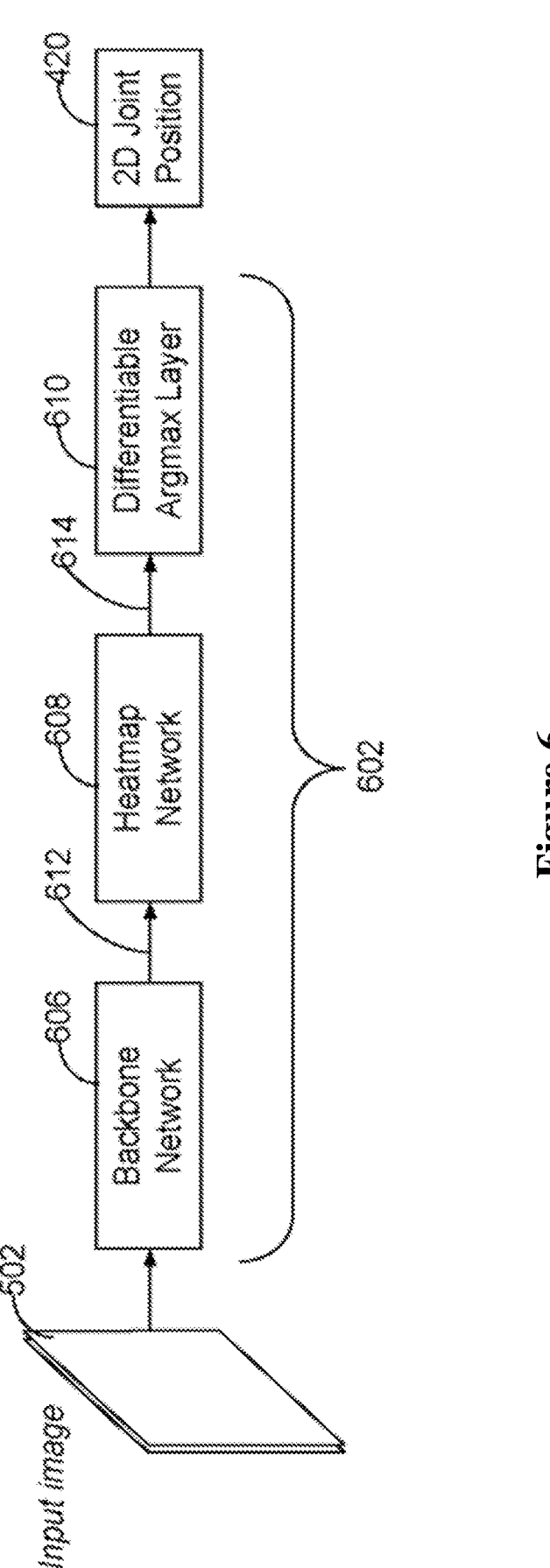
FIG. 6 is an example flow chart of a process for identifying 2D joint positions from image data, in accordance with some embodiments.

FIG. 6 is an example flow chart of a process 600 for identifying 2D joint positions from image data, in accordance with some embodiments. A 2D pose estimation network 602 is trained to predict positions 604 of key points of a human body in an image 502 (i.e., 2D joint positions 604 in the image 502). The 2D pose estimation network 602 includes a backbone network 606 (e.g., MobilenetV2), a heatmap network 608, and a differentiable argmax layer 610. The backbone network 606 is configured to extract a plurality of image features 612, and the heatmap network 608 is configured to generate a respective heatmap 614 from the image features 612 for each joint of the human body. In some embodiments, the backbone network 606 includes a plurality of dense upsampling convolution layers stacked to make the backbone network 606 more efficient in a mobile platform. The image features 612 extracted by the backbone network 606 have a first resolution, and the respective heatmap 614 of each joint has a second resolution that is higher than the first resolution. More specifically, after the image 502 is cropped, the backbone and heatmap networks 606 and 608 determine a plurality of key points (e.g., joints of the human body) and a probability for each point that is within a disk of radius from a location of each key point. Each key point is associated with the respective heatmap 614 showing the probability for each point within the disk of radius from the location of the respective key point. In an example, the human body has 16 joints and correspond to 16 heatmaps.

The differentiable argmax layer 610 is configured to identify a coordinate of each joint directly through the respective heatmap 614. For each of the 16 joints of the human body, the differentiable argmax layer 610 is applied to transform the respective heatmap 614, thereby identifying a 2D joint position 604 of the respective joint. In some embodiments, each heatmap 614 has a local maximum probability at the location of the respective key point associated with the joint of the human body. Conversely, in some embodiments, the differentiable argmax layer 610 is to transform each heatmap 614 into numerical coordinates (e.g., $(x_i, y_i)$ for an i-th joint), thereby identifying the location of the respective key point associated with the joint of the human body (i.e., a 2D joint position 604 of the respective joint). This allows the whole training pipeline to be implemented in an end-to-end manner. The differentiable argmax layer 610 is fully differentiable and has no trainable parameters. The differentiable argmax layer 610 is receives an m×n heatmap H, which is normalized. Let X and Y be m×n resolution matrices, where $$X_{ij} = \frac{2j - (n+1)}{n} \text{ and } Y_{ij} = \frac{2i - (m+1)}{m}.$$

Each X or Y matrix scales each x or y coordinate into a range of $(-1, 1)$ respectively. The differentiable argmax layer 610 corresponds to a first Frobenius inner product of a first matrix X and the heatmap H and a second Frobenius inner product of a second matrix Y and the heatmap H, and projects the 2D joint position into $(-1, 1)$. In some embodiments, each 2D joint position is unprojected or unnormalized to its original resolution. By these means, the 2D joint position 604 can be identified with a sub-pixel precision.

In some embodiments, the 2D pose estimation network 602 applied by the 2D pose estimation module 508 is trained using two public datasets, MPII and COCO dataset. Each image 502 used to train the 2D pose estimation network has at least 10 human joints (e.g., >10 key points), which makes the selected dataset contains around 40000 images. In an example, the 2D pose estimation network 602 (e.g., including a backbone network 606, heatmap network 608, and differentiable argmax layer 610) is trained in an end-to-end manner using 0.45G FLOPS, and therefore, can be implemented in a mobile device.

Figure 7B:
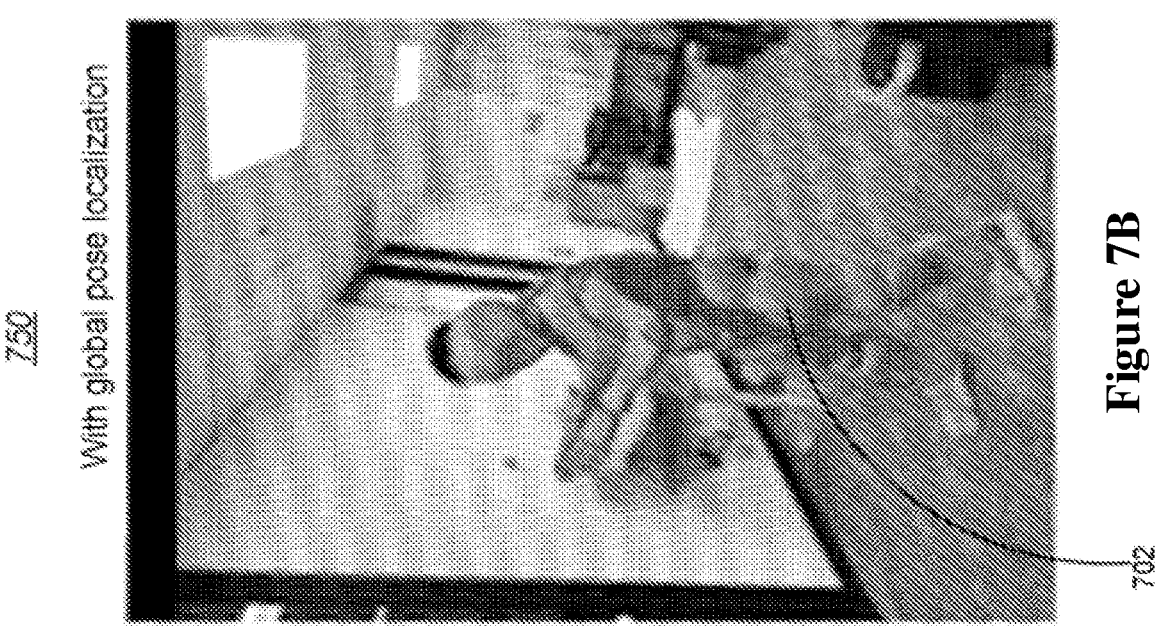
FIG. 7B is an example image of rendering the avatar on top of the human body using a global position, in accordance with some embodiments.
Figure 7A:
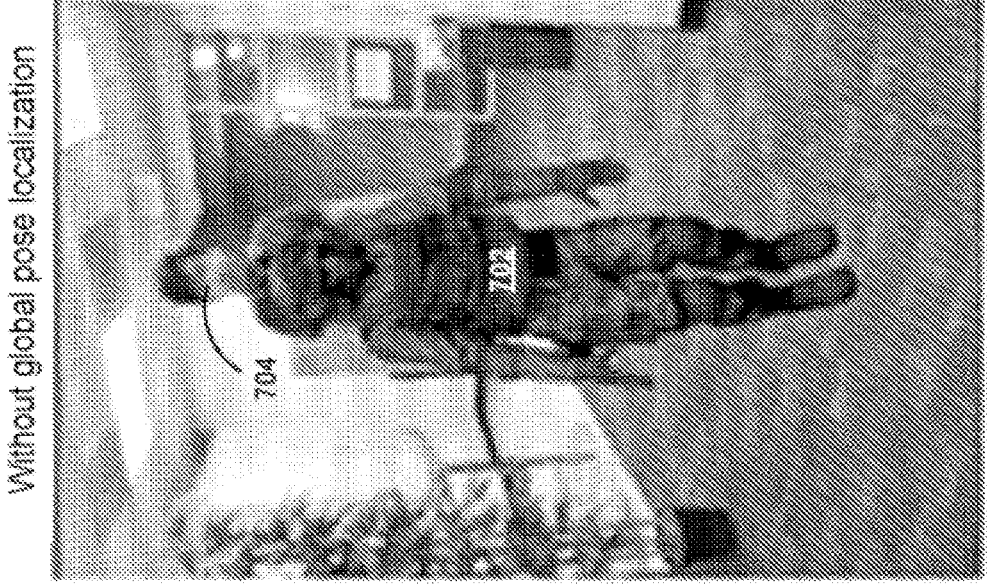
FIG. 7A is an example image of rendering an avatar on top of a human body without using a global position, in accordance with some embodiments.

FIG. 7A is an example image 700 of rendering an avatar 702 on top of a human body 704 without using a global position, in accordance with some embodiments, and FIG. 7B is an example image 750 of rendering the avatar 702 on top of the human body using a global position, in accordance with some embodiments. Referring to FIG. 7A, no global position is determined for the avatar 702, and a skeleton template of the avatar 702 is simply rendered in an image captured by a camera. The avatar 702 and the human body 704 do not entirely overlap. Referring to FIG. 7B, a global position is determined for the avatar 702 in a camera coordinate, and a skeleton template of the avatar 702 is rendered at the global position and has a rotation angle of each joint. The global position of the avatar 702 is determined based on a location of the person in the image (e.g., the image 502), and the skeleton template of the avatar 702 is rendered on top of and substantially covers the person in the same image. The avatar 702 is rendered in real time, e.g., having a latency less than a threshold time. The avatar 702 tracks the human body 704 captured in the images more closely in FIG. 7B than in FIG. 7A, thereby making the rendered avatar 702 more immersive. As such, with global position added, a virtual character associated with the avatar 702 may accurately track a motion trajectory of the human body 704 in space.

Figure 8:
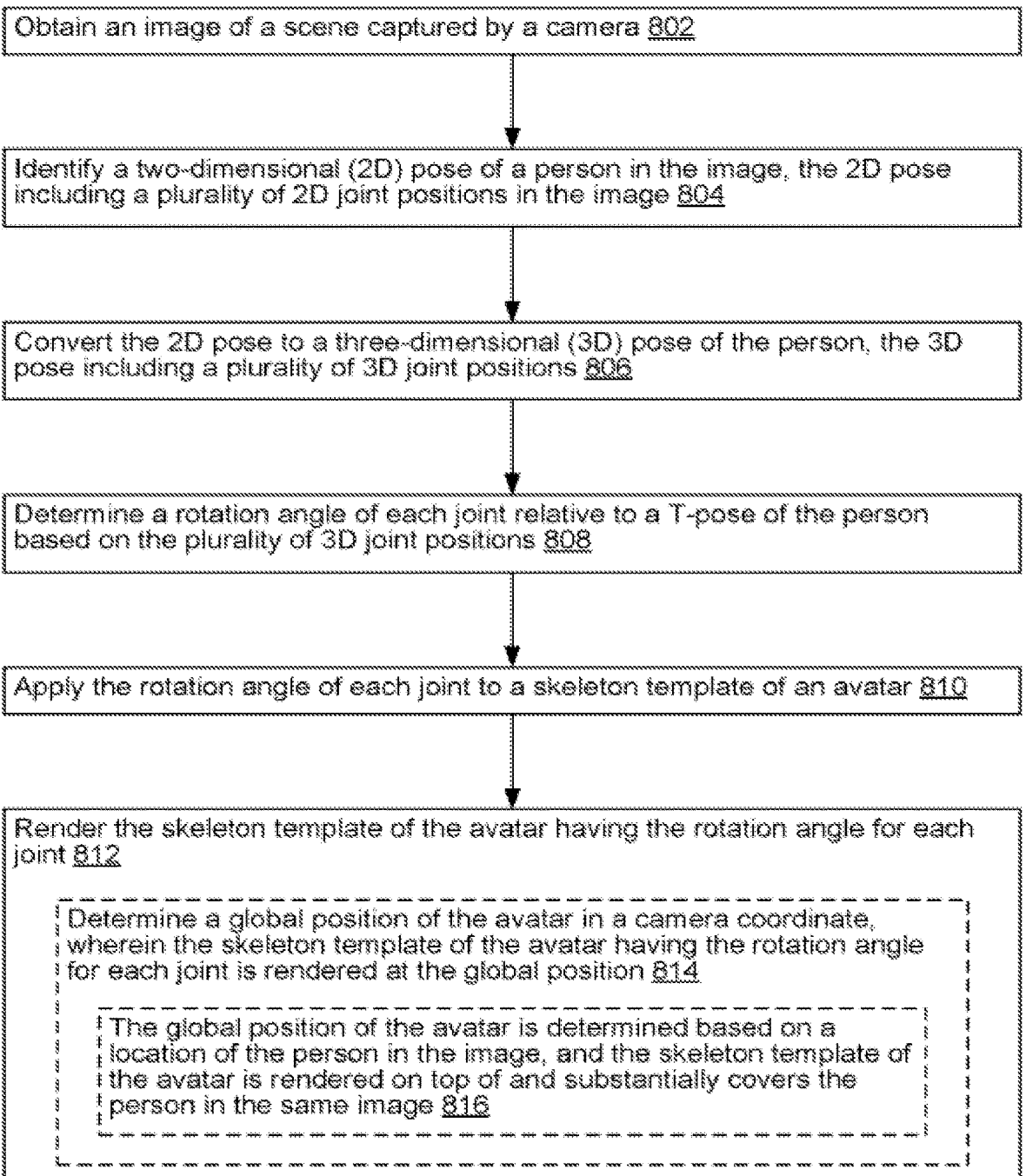
FIG. 8 is a flowchart of a method for rendering and driving an avatar based on an image captured by a camera, in accordance with some embodiments.

FIG. 8 is a flowchart of a method 800 for rendering and driving an avatar based on an image captured by a camera, in accordance with some embodiments. For convenience, the method 800 is described as being implemented by a computer system (e.g., a client device 104, a server 102, or a combination thereof). An example of the client device 104 is a mobile phone 104C or AR glasses 104D. Specifically, the method is implemented by a data processing module 500. Method 800 is, optionally, governed by instructions that are stored in a non-transitory computer readable storage medium and that are executed by one or more processors of the computer system. Each of the operations shown in FIG. 8 may correspond to instructions stored in a computer memory or non-transitory computer readable storage medium (e.g., memory 206 of the computer system 200 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 800 may be combined and/or the order of some operations may be changed.

The computer system obtains (802) an image of a scene captured by a camera and identifies (804) a two-dimensional (2D) pose of a person in the image. The 2D pose includes a plurality of 2D joint positions in the image, e.g., using a 2D pose estimation model. The computer system converts (806) the 2D pose to a three-dimensional (3D) pose of the person. The 3D pose includes a plurality of 3D joint positions, e.g., relative to a root joint (i.e., a hip joint) of the person. The computer system determines (808) a rotation angle of each joint relative to a T-pose of the person based on the plurality of 3D joint positions. The rotation angle of each joint is applied (810) to a skeleton template of an avatar to render (812) the skeleton template of the avatar having the rotation angle for each joint. In some embodiments, the computer system determines (814) a global position of the avatar in a camera coordinate. The skeleton template of the avatar having the rotation angle for each joint is rendered at the global position. Additionally, in some embodiments, the global position of the avatar is determined (816) based on a location of the person in the image, and the skeleton template of the avatar is rendered on top of and substantially covers the person in the same image. In some embodiments, the avatar is rendered in real time (i.e., with a latency less than a threshold time (e.g., 5 millisecond)).

In some embodiments, the image is a first image, and the skeleton template of the avatar is rendered in a second image that is distinct from the first image.

In some embodiments, after obtaining the image, the computer system identifies the person in the image and cropping the image to keep a portion of the image including the person.

In some embodiments, the person has a predefined number of joints. The computer system identifies the 2D pose of the person in the image by applying a backbone network to the image to extract a plurality of features and, for each of the predefined number of joints, generating a respective heatmap from the plurality of features. The respective heatmap indicates a probability of a key point corresponding to the respective joint being located in each location of the image. Further, in some embodiments, the computer system identifies the 2D pose of the person in the image by, for each of the predefined number of joints, applying a differentiable argmax layer to transform the respective heatmap, thereby identifying the 2D joint position of the respective joint. Additionally, in some embodiments, the differentiable argmax layer corresponds to a first Frobenius inner product of a first matrix X and the heatmap and a second Frobenius inner product of a second matrix Y and the heatmap. The first matrix X and second matrix Y have a resolution of m×n, and are represented as $$X_{ij} = \frac{2j - (n+1)}{n}$$

and $$Y_{ij} = \frac{2i - (m+1)}{m},$$

respectively. The computer system identifies the 2D pose of the person in the image further by unnormalizing the 2D joint position of each joint transformed from the respective heatmap by the differentiable argmax layer.

In some embodiments, the computer system determines the rotation angle of each joint relative to the T-pose of the person by building a kinematic skeleton tree starting from a hip key point based on the plurality of 3D joint positions; in accordance with the kinematic skeleton tree, associating each joint with a parent key point and a child key point to form a respective plane and generate a respective normal vector; and, for each joint, determining the rotation angle from an angle between the respective vector associated with the kinematic skeleton tree and a corresponding vector associated with the T-pose of the person.

In some embodiments, the computer system renders the skeleton template of the avatar by refreshing the skeleton template of the avatar according to a refresh rate greater than a threshold rate, such that the avatar is rendered in real time according to the image. An example of the threshold rate is 30 Hz.

In some embodiments, the 2D pose of the person is identified in the image using a 2D pose estimation network, and converted to the 3D pose using a 3D pose estimation network, and each of the 2D pose estimation network and 3D pose estimation network is trained independently.

In some embodiments, the 2D pose of the person is identified in the image using a 2D pose estimation network, and converted to the 3D pose using a 3D pose estimation network. Each of the 2D and 3D pose estimation networks includes a plurality of layers, and each layer has a respective number of filters. Each filter is associated with a plurality of weights. For each of the 2D and 3D pose estimation networks, the computer system maintains a float32 format for the plurality of weights of each filter while the respective pose estimation network is trained. After generating the respective pose estimation network, the computer system quantizes the plurality weights of each filter to an int8, uint8, int16 or uint16 format. Further, in some embodiments, the 2D and 3D pose estimation networks are trained by a server, and the plurality of weights of each filter are quantized by the server based on a precision setting of an electronic device. After quantizing the plurality of weights of each filter, the server provides the 2D and 3D pose estimation networks to the electronic device.

It should be understood that the particular order in which the operations in FIG. 8 have been described are merely exemplary and are not intended to indicate that the described order is the only order in which the operations could be performed. One of ordinary skill in the art would recognize various ways to annotate key points in images as described herein. Additionally, it should be noted that details of other processes described above with respect to FIGS. 5, 6, and 7A-7B are also applicable in an analogous manner to method 800 described above with respect to FIG. 8. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for driving an avatar, comprising:
obtaining an image of a scene captured by a camera;
identifying a two-dimensional (2D) pose of a person in the image, the 2D pose including a plurality of 2D joint positions in the image;
converting the 2D pose to a three-dimensional (3D) pose of the person, the 3D pose including a plurality of 3D joint positions;
determining a rotation angle of each joint relative to a T-pose of the person based on the plurality of 3D joint positions;
applying the rotation angle of each joint to a skeleton template of an avatar; and
rendering the skeleton template of the avatar having the rotation angle for each joint;
wherein determining the rotation angle of each joint relative to the T-pose of the person, comprises:
building a kinematic skeleton tree starting from a hip key point based on the plurality of 3D joint positions;
in accordance with the kinematic skeleton tree, associating each joint with a parent key point and a child key point to form a respective plane and generate a respective normal vector; and
for each joint, determining the rotation angle from an angle between the respective vector associated with the kinematic skeleton tree and a corresponding vector associated with the T-pose of the person.

2. The method of claim 1, further comprising:
determining a global position of the avatar in a camera coordinate, wherein the skeleton template of the avatar having the rotation angle for each joint is rendered at the global position.

3. The method of claim 2, wherein the global position of the avatar is determined based on a location of the person in the image, and the skeleton template of the avatar is rendered on top of and substantially covers the person in the same image.

4. The method of claim 1, wherein the image is a first image, and the skeleton template of the avatar is rendered in a second image that is distinct from the first image.

5. The method of claim 1, further comprising:

after obtaining the image, identifying the person in the image and cropping the image to keep a portion of the image including the person.

6. The method of claim 1, wherein the person has a predefined number of joints, and identifying the 2D pose of the person in the image comprises:

applying a backbone network to the image to extract a plurality of features;

for each of the predefined number of joints, generating a respective heatmap from the plurality of features, the respective heatmap indicating a probability of a key point corresponding to the respective joint being located in each location of the image; and for each of the predefined number of joints, applying a differentiable argmax layer to transform the respective heatmap, thereby identifying the 2D joint position of the respective joint.

7. The method of claim 6, wherein:

the differentiable argmax layer corresponds to a first Frobenius inner product of a first matrix X and the heatmap and a second Frobenius inner product of a second matrix Y and the heatmap;

the first matrix X and second matrix Y have a resolution of m×n, and are represented as $$X_{ij} = \frac{2j - (n+1)}{n} \text{ and } Y_{ij} = \frac{2i - (m+1)}{m}.$$

respectively; and identifying the 2D pose of the person in the image further includes unnormalizing the 2D joint position of each joint transformed from the respective heatmap by the differentiable argmax layer.

8. The method of claim 6, wherein the backbone network comprises a plurality of dense up-sampling convolution layers, the plurality of features extracted by the backbone network have a first resolution, and the respective heatmap of each joint has a second resolution that is higher than the first resolution.

9. The method of claim 1, wherein rendering the skeleton template of the avatar further comprises:

refreshing the skeleton template of the avatar according to a refresh rate greater than a threshold rate, such that the avatar is rendered in real time according to the image.

10. The method of claim 1, wherein the 2D pose of the person is identified in the image using a 2D pose estimation network, and converted to the 3D pose using a 3D pose estimation network, and each of the 2D pose estimation network and 3D pose estimation network is trained independently.

11. The method of claim 1, wherein:

the 2D pose of the person is identified in the image using a 2D pose estimation network, and converted to the 3D pose using a 3D pose estimation network;

each of the 2D and 3D pose estimation networks includes a plurality of layers, and each layer has a respective number of filters, each filter associated with a plurality of weights; and the method further comprises for each of the 2D and 3D pose estimation networks:

maintaining a float32 format for the plurality of weights of each filter while the respective pose estimation network is trained; and after generating the respective pose estimation network, quantizing the plurality weights of each filter to an int8, uint8, int16 or uint16 format.

12. The method of claim 11, wherein the 2D and 3D pose estimation networks are trained by a server, the plurality of weights of each filter are quantized by the server based on a precision setting of an electronic device, and the trained 2D and 3D pose estimation networks obtained after quantization of the plurality of weights of each filter are provided to the electronic device by the server.

13. A computer system, comprising:

one or more processors; and a memory having instructions stored thereon, which when executed by the one or more processors cause the processors to perform a method for driving an avatar, wherein the method comprises:

obtaining an image of a scene captured by a camera;

identifying a two-dimensional (2D) pose of a person in the image, the 2D pose including a plurality of 2D joint positions in the image;

converting the plurality of 2D joint positions to a plurality of three-dimensional (3D) joint positions;

determining, based on the plurality of 3D joint positions, a rotation angle of each joint relative to a T-pose of the person;

applying the rotation angle of each joint to a skeleton template of an avatar; and rendering the skeleton template of the avatar having the rotation angle for each joint;

wherein determining, based on the plurality of 3D joint positions, the rotation angle of each joint relative to the T-pose of the person, comprises:

building a kinematic skeleton tree starting from a hip key point based on the plurality of 3D joint positions;

in accordance with the kinematic skeleton tree, associating each joint with a parent key point and a child key point to form a respective plane and generate a respective normal vector; and for each joint, determining the rotation angle from an angle between the respective vector associated with the kinematic skeleton tree and a corresponding vector associated with the T-pose of the person.

14. The computer system of claim 13, wherein the method further comprises:

determining, based on a location of a person in the image, a global position of the avatar in a camera coordinate;

wherein rendering the skeleton template of the avatar having the rotation angle for each joint comprises:

rendering the skeleton template of the avatar having the rotation angle for each joint on top of and substantially covers the person in the same image.

15. The computer system of claim 13, wherein the person has a predefined number of joints, and identifying the 2D pose of the person in the image comprises:

applying a backbone network to the image to extract a plurality of features;

for each of the predefined number of joints, generating a respective heatmap from the plurality of features, the respective heatmap indicating a probability of a key point corresponding to the respective joint being located in each location of the image; and for each of the predefined number of joints, applying a differentiable argmax layer to transform the respective heatmap, thereby identifying the 2D joint position of the respective joint.

16. The computer system of claim 15, wherein the differentiable argmax layer corresponds to a first Frobenius inner product of a first matrix X and the heatmap and a second Frobenius inner product of a second matrix Y and the heatmap;

the first matrix X and second matrix Y have a resolution of m×n, and are represented as $$X_{ij} = \frac{2j - (n+1)}{n} \text{ and } Y_{ij} = \frac{2i - (m+1)}{m},$$

respectively; and identifying the 2D pose of the person in the image further comprises:

unnormalizing the 2D joint position of each joint transformed from the respective heatmap by the differentiable argmax layer.

17. A non-transitory computer-readable medium, having instructions stored thereon, which when executed by one or more processors cause the processors to perform a method for driving an avatar, wherein the method comprises:

obtaining an image of a scene captured by a camera;

identifying a two-dimensional (2D) pose of a person in the image, the 2D pose including a plurality of 2D joint positions in the image;

determining a plurality of three-dimensional (3D) joint positions based on the plurality of 2D joint positions;

determining a rotation angle of each joint relative to a T-pose of the person, based on the plurality of 3D joint positions;

obtaining a skeleton template of an avatar having the rotation angle for each joint; and rendering, at a global position of the avatar in a camera coordinate, the skeleton template of the avatar having the rotation angle of each joint;

wherein determining the rotation angle of each joint relative to the T-pose of the person based on the plurality of 3D joint positions, comprises:

building, based on the plurality of 3D joint positions, a kinematic skeleton tree starting from a hip key point;

in accordance with the kinematic skeleton tree, associating each joint with a parent key point and a child key point to form a respective plane and generate a respective normal vector; and for each joint, determining the rotation angle from an angle between the respective vector associated with the kinematic skeleton tree and a corresponding vector associated with the T-pose of the person.

18. The non-transitory computer-readable medium of claim 17, wherein the person has a predefined number of joints, and identifying the 2D pose of the person in the image comprises:

applying a backbone network to the image to extract a plurality of features;

for each of the predefined number of joints, generating a respective heatmap from the plurality of features, the respective heatmap indicating a probability of a key point corresponding to the respective joint being located in each location of the image; and for each of the predefined number of joints, applying a differentiable argmax layer to transform the respective heatmap, thereby identifying the 2D joint position of the respective joint.

19. The non-transitory computer-readable medium of claim 18, wherein the differentiable argmax layer corresponds to a first Frobenius inner product of a first matrix X and the heatmap and a second Frobenius inner product of a second matrix Y and the heatmap;

the first matrix X and second matrix Y have a resolution of m×n, and are represented as $$X_{ij} = \frac{2j - (n+1)}{n} \text{ and } Y_{ij} = \frac{2i - (m+1)}{m},$$

respectively; and identifying the 2D pose of the person in the image further comprises:

unnormalizing the 2D joint position of each joint transformed from the respective heatmap by the differentiable argmax layer.

20. The non-transitory computer-readable medium of claim 17, wherein determining the rotation angle of each joint relative to the T-pose of the person comprises:

building, based on the plurality of 3D joint positions, a kinematic skeleton tree starting from a hip key point;

in accordance with the kinematic skeleton tree, associating each joint with a parent key point and a child key point to form a respective plane and generate a respective normal vector; and for each joint, determining the rotation angle from an angle between the respective vector associated with the kinematic skeleton tree and a corresponding vector associated with the T-pose of the person.

* * * * *